United States Patent
Dotan et al.

(10) Patent No.: US 9,356,968 B1
(45) Date of Patent: May 31, 2016

(54) MANAGING AUTHENTICATION USING COMMON AUTHENTICATION FRAMEWORK CIRCUITRY

(71) Applicant: EMC Corporation, Hopkinton, MA (US)

(72) Inventors: Yedidya Dotan, Newton, MA (US); Kayvan Alikhani, Oakland, CA (US); Mohsen Emami-Nouri, San Francisco, CA (US); Vadim Bruk, Foster City, CA (US); Andrew Luke, San Francisco, CA (US); Lawrence N. Friedman, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 24 days.

(21) Appl. No.: 14/318,987

(22) Filed: Jun. 30, 2014

(51) Int. Cl.
| | |
|---|---|
| H04L 29/06 | (2006.01) |
| G06F 21/31 | (2013.01) |
| H04L 9/32 | (2006.01) |
| G06F 21/10 | (2013.01) |
| G06F 21/30 | (2013.01) |
| H04L 9/10 | (2006.01) |

(52) U.S. Cl.
CPC .............. *H04L 63/20* (2013.01); *G06F 21/31* (2013.01); *G06F 21/10* (2013.01); *G06F 21/30* (2013.01); *H04L 9/10* (2013.01); *H04L 9/32* (2013.01); *H04L 9/321* (2013.01); *H04L 9/3226* (2013.01); *H04L 63/083* (2013.01); *H04L 63/10* (2013.01)

(58) Field of Classification Search
CPC ..... H04L 63/20; H04L 63/0227; H04L 63/10; H04L 9/32; H04L 9/3226; H04L 9/321; H04L 63/083; H04L 9/10; G06F 21/62; G06F 21/6218; G06F 21/31; G06F 21/10; G06F 21/30

See application file for complete search history.

(56) References Cited

U.S. PATENT DOCUMENTS

| | | | |
|---|---|---|---|
| 8,468,347 B2 | 6/2013 | Mukkara et al. | |
| 8,566,916 B1 | 10/2013 | Vernon et al. | |
| 8,751,827 B1 | 6/2014 | Duane et al. | |
| 8,850,538 B1 | 9/2014 | Vernon et al. | |
| 8,850,546 B1 | 9/2014 | Field et al. | |
| 8,978,122 B1 | 3/2015 | Zolfonoon et al. | |
| 2013/0298187 A1* | 11/2013 | Black | G06F 21/00 726/1 |
| 2014/0075565 A1* | 3/2014 | Srinivasan | H04L 63/10 726/26 |

* cited by examiner

*Primary Examiner* — Kaveh Abrishamkar
*Assistant Examiner* — Ayoub Alata
(74) *Attorney, Agent, or Firm* — BainwoodHuang

(57) ABSTRACT

A technique manages user authentication via common authentication framework circuitry. The technique involves receiving, by the common authentication framework circuitry, authentication requests from client devices of users belonging to multiple enterprises, the authentication requests including user identifiers identifying the users belonging to the multiple enterprises. The technique further involves accessing, by the common authentication framework circuitry, entries of an authentication policy database to select authentication policies for the authentication requests. Selection of the authentication policies is based at least in part on the user identifiers of the authentication requests. The technique further involves invoking, by the common authentication framework circuitry, authentication services in accordance with the selected authentication policies to perform user authentication operations in response to the authentication requests from the client devices.

20 Claims, 5 Drawing Sheets

| User Identifier 152 | Enterprise Identifier 154 | Authentication Application 156 | Authentication Policy 158 | Parameters and Settings 160 (e.g., Lockout Tolerance, Password Reset Frequency, Risk Threshold, etc.) |
|---|---|---|---|---|
| UserID A_5097 | Company A | App2 | Voice (IdP #1) and OTP (IdP #2) | ... |
| UserID A_5098 | Company A | App2 | Voice (IdP #1) and OTP (IdP #2) | ... |
| UserID C_36 | Organization C | App3 | Retina (IdP #3) and Password (IdP #4) | ... |
| UserID A_5099 | Company A | App1 | Face (IdP #5) and OTP (IdP #6) | ... |
| UserID B_811 | Institution B | App2 | Fingerprint (IdP #7) and OTP (IdP #2) | ... |
| UserID B_810 | Institution B | App2 | Fingerprint (IdP #7) and OTP (IdP #2) | ... |
| ... | ... | ... | ... | ... |

FIG. 4

MANAGING AUTHENTICATION USING COMMON AUTHENTICATION FRAMEWORK CIRCUITRY

BACKGROUND

Generally, companies employ authentication to control access to protected resources. For example, a company may require its employees to successfully authenticate using one-time use passcodes (OTPs) from authentication tokens before allowing its employees to access the company's virtual private network (VPN), the company's file server, the company's employee database, and so on. If an employee is able to provide a OTP which is valid (i.e., a correct OTP which is current) within a certain number of tries (i.e., without exceeding a lockout limit), authentication is considered successful and the company's authentication server allows the employee to access the protected resources. However, if the OTP is invalid (e.g., incorrect, too old, etc.) or if the employee exceeds the lockout limit (e.g., too many failed authentication attempts within a set window of time), authentication is considered unsuccessful and the authentication server denies access to the company's protected resources.

It should be understood that different companies may perform employee authentication in different ways. For example, Company A may require its employees to authenticate using six-digit OTPs and lockout an employee if the employee fails three authentication attempts within a five minute span. Similarly, Company B may require its employees to authenticate using eight-digit OTPs but lockout an employee if the employee fails five authentication attempts within a 10 minute span.

As another example, Company C may require its employees to authenticate using fingerprint recognition via Identity Provider X (i.e., a trusted third-party which provides an authentication service). However, Company D may require its employees to authenticate using fingerprint recognition via Identity Provider Y rather than Identity Provider X, and so on.

SUMMARY

Unfortunately, there are deficiencies to the above-described conventional company authentication approaches. Along these lines, authentication is implemented differently in almost every large company. Even when companies use off-the-shelf authentication products or services, these companies may configure the same authentication products and services differently. For instance, some companies may prefer specific versions of authentication products or services, or prefer a specific combination of identity providers (e.g., voice recognition from Identity Provider #1 rather than from Identity Provider #2, face recognition from Identity Provider #3 rather than from Identity Provider #4, etc.), and so on. Moreover, some companies will build their own version of known authentication methods, some companies will build their own OTP tokens, some companies will have their own unique public key infrastructure (PKI), some companies will build their own biometric methods, etc.

Additionally, the performance and operation of these different company authentication methods may vary. Along these lines, some companies may want a specific part of identities to reside on premise (e.g., for greater control, security, etc.) but other companies may want that information handled by an identity provider in the cloud (e.g., for greater flexibility, scalability, etc.).

In contrast to the above-described company authentication approaches, improved techniques are directed to managing authentication using a common authentication framework. The circuitry for such a framework is capable of receiving authentication requests from users belonging to different enterprises or different organizational entities and, based on predefined authentication policies, performing authentication differently in a transparent, well-structured manner. Along these lines, such circuitry can perform authentication using a variety of different authentication factors such as using OTPs with different levels of forgiveness (e.g., different valid OTP time windows, different lockout limits, etc.) for different companies. As another example, such circuitry can use face recognition from one identity provider for Company A, and face recognition from another identify provider for Company B, and so on. Furthermore, when the circuitry is structured to communicate with the identity providers (IdP) via IdP connectors (or interface ports), an enterprise can easily swap one identity provider with another in a transparent manner. Moreover, one or more portions of such circuitry may reside in the cloud for flexibility, scalability, high availability, and so on. As a result, companies are able to utilize their own identity providers, operating parameters, and policies for authentication.

One embodiment is directed to a method of managing user authentication via common authentication framework circuitry. The method includes receiving, by the common authentication framework circuitry, authentication requests from client devices of users belonging to multiple enterprises, the authentication requests including user identifiers identifying the users belonging to the multiple enterprises. The method further includes accessing, by the common authentication framework circuitry, entries of an authentication policy database to select authentication policies for the authentication requests. Selection of the authentication policies is based at least in part on the user identifiers of the authentication requests. The method further includes invoking, by the common authentication framework circuitry, authentication services in accordance with the selected authentication policies to perform user authentication operations in response to the authentication requests from the client devices.

In some arrangements, the authentication requests further include enterprise identifiers identifying the multiple enterprises. In these arrangements, accessing the entries of the authentication policy database to select the authentication policies for the authentication requests includes selecting authentication policies for the authentication requests based on (i) the user identifiers of the authentication requests and (ii) the enterprise identifiers of the authentication requests.

In some arrangements, receiving the authentication requests includes:
  (i) receiving a first authentication request from a first client device of a first user belonging to a first enterprise, the first authentication request including a first user identifier which identifies the first user and a first enterprise identifier which identifies the first enterprise, and
  (ii) receiving a second authentication request from a second client device of a second user belonging to a second enterprise, the second authentication request including a second user identifier which identifies the second user and a second enterprise identifier which identifies the second enterprise, the first enterprise and the second enterprise being separate organizational entities.

In these arrangements, selecting the authentication policies for the authentication requests includes:

(i) for the first authentication request, choosing a first authentication policy from a plurality of authentication policies in the authentication policy database based on the first user identifier and the first enterprise identifier, and (ii) for the second authentication request, choosing a second authentication policy from the plurality of authentication policies based on the second user identifier and the second enterprise identifier.

In some arrangements, invoking the authentication services in accordance with the selected authentication policies to perform user authentication operations in response to the authentication requests from the client devices includes:

(i) in response to the first authentication request, identifying a first set of authentication services based on the first authentication policy and invoking the first set of authentication services to authenticate a current user of the first client device, and (ii) in response to the second authentication request, identifying a second set of authentication services based on the second authentication policy and invoking the second set of authentication services to authenticate a current user of the second client device.

In some arrangements, the common authentication framework circuitry is constructed and arranged to operate as a common policy engine having different authentication factor modules which connect to different authentication service sources through different identity provider connectors. In these arrangements, invoking the first set of authentication services includes directing a first set of the authentication factor modules of the common policy engine to provide a first set of authentication factors from the current user of the first client device to a first set of authentication service sources via a first set of identity provider connectors to authenticate the current user of the first client device. In these arrangements, invoking the first set of authentication services further includes invoking the second set of authentication services includes directing a second set of the authentication factor modules of the common policy engine to provide a second set of authentication factors from the current user of the second client device to a second set of authentication service sources via a second set of identity provider connectors to authenticate the current user of the second client device.

In some arrangements, at least one of the first set of authentication service sources is (i) co-located with the common policy engine and (ii) remote from the first client device.

In other arrangements, at least one of the first set of authentication service sources is located at a third party service provider location which is (i) remote from the common policy engine and (ii) remote from the first client device.

In yet other arrangements, at least one of the first set of authentication service sources (i) resides within the first client device and (ii) is remote from the common policy engine.

In a particular arrangement, a first authentication service source of the first set of authentication service sources is (i) co-located with the common policy engine and (ii) remote from the first client device; a second authentication service source of the first set of authentication service sources is located at a third party service provider location which is (i) remote from the common policy engine and (ii) remote from the first client device; and a third authentication service source of the first set of authentication service sources (i) resides within the first client device and (ii) is remote from the common policy engine.

In some arrangements, the common authentication framework circuitry (i) includes an authentication request queue to temporarily store the authentication requests and (ii) imposes a predefined sensitivity threshold as a measure of sensitivity. In these arrangements, the method further comprises:

(A) receiving a third authentication request from a third client device of a third user, the third authentication request including a third user identifier which identifies the third user, (B) when an authentication request queue limit for the authentication request queue is not met, processing at least a portion of the third authentication request at a normal authentication service regardless of a sensitivity level of the third authentication request, (C) when (i) the authentication request queue limit for the authentication request queue is met and (ii) the sensitivity level of the third authentication request is greater than or equal to the predefined sensitivity threshold, processing at least a portion of the third authentication request at the normal authentication service, and (D) when (i) the authentication request queue limit for the authentication request queue is met and (ii) the sensitivity level of the third authentication request is less than the predefined sensitivity threshold, processing at least the portion of the third authentication request at a reserve authentication service which is different from the normal authentication service.

Another embodiment is directed to a common authentication framework apparatus which includes a communications interface, memory which holds an authentication policy database, and control circuitry coupled to the communications interface and the memory. The memory stores instructions which, when carried out by the control circuitry, causes the control circuitry to:

(A) receive authentication requests from client devices of users belonging to multiple enterprises through the communications interface, the authentication requests including user identifiers identifying the users belonging to the multiple enterprises, (B) access entries of the authentication policy database to select authentication policies for the authentication requests, selection of the authentication policies being based at least in part on the user identifiers of the authentication requests, and (C) invoke authentication services in accordance with the selected authentication policies to perform user authentication operations in response to the authentication requests from the client devices.

Yet another embodiment is directed to a computer program product having a non-transitory computer readable medium which stores a set of instructions to manage user authentication. The set of instructions, when carried out by computerized circuitry, causes the computerized circuitry to perform a method of:

(A) receiving authentication requests from client devices of users belonging to multiple enterprises, the authentication requests including user identifiers identifying the users belonging to the multiple enterprises;

(B) accessing entries of an authentication policy database to select authentication policies for the authentication requests, selection of the authentication policies being based at least in part on the user identifiers of the authentication requests; and (C) invoking authentication services in accordance with the selected authentication policies to perform user authentication operations in response to the authentication requests from the client devices.

It should be understood that, in the cloud context, electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in managing authentication using common authentication framework circuitry.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a block diagram of a database which is utilized by the common authentication framework.

DETAILED DESCRIPTION

An improved technique is directed to managing authentication using a common authentication framework. Such a framework is capable of receiving authentication requests from human users belonging to different enterprises (or entities) and, based on authentication policies predefined for those enterprises, transparently performing authentication in a well-structured but enterprise-tailored manner. Along these lines, such a framework is capable of performing a variety of different types of authentication such as using one-time use passcodes (OTPs) with different levels of forgiveness (e.g., different valid OTP time windows, different lockout limits, etc.) for different entities. As another example, such a framework can offer different identity services to its users (e.g., use fingerprint recognition from one identity provider for Entity X, and fingerprint recognition from another identify provider for Entity Y, and so on). Furthermore, when such a framework is configured to communicate with the identity providers (IdP) via IdP connectors (or interface ports), an enterprise can transparently replace one IdP with another IdP in a seamless manner. Moreover, new IdPs can be conveniently integrated, combined, modified/updated, reconfigured, directed to operate using different parameters and/or settings, and so on. As a result, entities are able to utilize their own identity providers (e.g., bring your own IdP), operating parameters, and policies for authentication.

Figure 1:
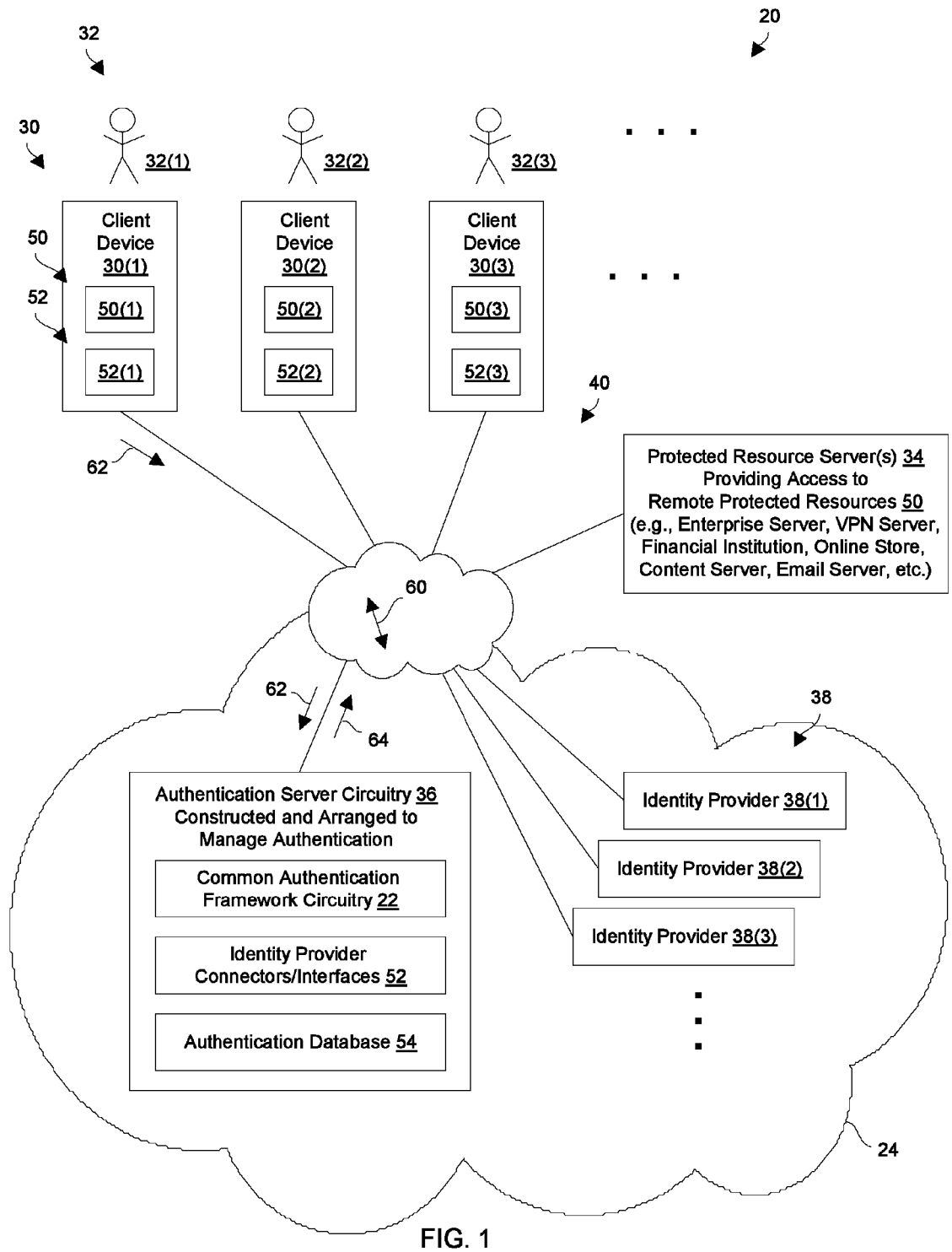
FIG. 1 is a block diagram of an electronic environment which manages authentication using a common authentication framework.

FIG. 1 shows an electronic environment 20 which manages authentication using common authentication framework circuitry 22. It should be understood that such circuitry 22 can be disposed at a single location (e.g., within a server apparatus or at central server farm, within a client device, etc.), or distributed among multiple locations (e.g., in a cloud implementation among remote computer resources distributed over a network, remotely among multiple server sites, among client and server devices, etc.). All situations are intended to belong to various embodiments of the invention. However, for illustration purposes and with reference to FIG. 1, an embodiment in which the common authentication framework circuitry 22 is deployed in the cloud 24 will now be provided.

FIG. 1 shows an electronic environment 20 which is suitable for managing authentication via common authentication framework circuitry 22. The electronic environment 20 includes client devices 30(1), 30(2), 30(3), . . . (collectively, client devices 30) under direction of their respective human users 32(1), 32(2), 32(3), . . . (collectively, users 32), a set of protected resource servers 34 (i.e., one or more protected resource servers 34), authentication server circuitry 36, IdP devices 38(1), 38(2), 38(3), . . . (collectively, IdP devices 38), and a communications medium 40.

Each client device 30 includes a local set of protected resources 50 and circuitry 52 involved in authentication (e.g., processing circuitry running specialized authentication code, a microphone, a camera, a touch screen, etc.). The circuitry 52 is constructed and arranged to provide controlled access to one or more protected resources 50 on behalf of its respective user 32. Such protected resources 50 may reside locally on the client device 30 (e.g., see protected resources 50(1), 50(2), 50(3), . . . ), or remotely on one or more protected resource servers 34. Suitable local protected resources 50 include general user access (e.g., unlocking the client devices 30), access to locally stored content (e.g., documents, a database, a contacts list, confidential information, access to certain applications, games, photos, music, movies), and access to other resources (e.g., network access, phone access, system privileges, access to specialized hardware and peripherals), and so on.

The set of protected resource servers 34 maintains remote protected resources 50. Such protected resources 50 are capable of being accessed by the client devices 30. Suitable remote protected resources 50 include (among others) accounts and databases of enterprises, VPNs/gateways/other networks, account access and transaction access with banks/brokerages/other financial institutions, transaction access at online stores, remote databases containing movies/music/files/other content, access to email, access to online games, and so on.

The authentication server circuitry 36 is equipped to participate in authentication and manages the authentication process using a common authentication framework. To this end, the authentication circuitry 36 includes at least some of the common authentication framework circuitry 22, IdP connectors (or interfaces) 52, and an authentication database 54. The common authentication framework circuitry 22 is constructed and arranged to perform authentication operations to authenticate the human users 32 of the client devices 30. Such authentication may be of various forms such as standard authentication (e.g., based on passwords, OTPs, biometrics, etc.), adaptive or risk-based authentication (e.g., based on calculation of a risk score or a measure of riskiness that the users are fraudulent from a comparison between previous and current user behavior), knowledge-based authentication (KBA), combinations thereof, and so on. The IdP connectors 52 are constructed and arranged as interface ports to enable the common authentication framework circuitry 22 to communicate with individual IdP devices 38. The authentication database 54 holds authentication-related data such as authentication policy data, user data, and so on.

The IdP devices 38 provide authentication services to support the operation of the authentication server circuitry 36 during user authentication. Each IdP device 38 provides a respective authentication service (or services) and may be under control of a different third-party identity service provider (i.e., a separate or independent IdP organization).

For example, both IdP Organization A and IdP Organization B may provide facial recognition authentication services. However, certain enterprises of the electronic environment 20 may utilize the facial recognition services provided by IdP Organization A, while other enterprises of the electronic environment 20 utilize the facial recognition services provided by IdP Organization B.

Likewise, both IdP Organization C and IdP Organization D may provide voice recognition authentication services. However, certain enterprises of the electronic environment 20 may utilize the voice recognition services provided by IdP Organization C, while other enterprises of the electronic environment 20 utilize the authentication services provided by IdP Organization D.

It should be understood that other types of authentication services can be utilized as well such as those for processing passwords, OTPs, fingerprint scans, retina scans, knowledge-based authentication, and so on. Furthermore, some enterprises may authenticate users 32 using forms of standard authentication (e.g., multi-factor authentication), while others use more complex forms of authentication (e.g., adaptive authentication, KBA, step-up authentication, combinations thereof, etc.), and so on.

The communications medium 40 is constructed and arranged to connect the various components of the electronic environment 20 together to enable these components to exchange electronic signals 60 (e.g., see the double arrow 60). At least a portion of the communications medium 40 is illustrated as a cloud to indicate that the communications medium 40 is capable of having a variety of different topologies including backbone, hub-and-spoke, loop, irregular, combinations thereof, and so on. Along these lines, the communications medium 40 may include copper-based data communications devices and cabling, fiber optic devices and cabling, wireless devices, combinations thereof, etc. Furthermore, the communications medium 40 is capable of supporting LAN-based communications, SAN-based communications, cellular communications, combinations thereof, etc.

During operation, the users 32 operate their respective client devices 30 to perform useful work. Such work may include accessing one or more protected resources 50 (e.g., viewing a file, reading email, running a protected application, making an online purchase or a banking transaction, etc.). Such operation may involve access to local protected resources 50 of the client devices 30 (e.g., access to certain applications or apps, access to unlock the client devices, access to locally stored data, etc.). Alternatively or in combination, such operation may involve access to remote protected resources 50 of the external protected resource servers 34 (e.g., remote login access, remote access to content, ability to complete remote transactions, etc.). Other access control activities include installing applications, adding contacts, connecting to different networks, accessing resources, and so on.

Some client devices 30 may be equipped with special peripherals that enable the users 32 to perform operations using the protected resources 50 upon successful authentication. For example, in the context of a smart phone or tablet, a user 32 may be required to successfully authenticate before making cellular calls, navigating using maps and GPS circuitry, taking pictures, and so on.

During the course of user authentication, the client devices 30, the protected resource servers 34, and the authentication server circuitry 36 collaborate to control access to the protected resources 50. The common authentication framework formed by such equipment enables new IdPs to be added, incorporated into the system, modified, etc. in a modular manner which is transparent to the users 32.

In particular, the authentication server circuitry 36 receives an authentication request 62 containing particular information identifying a user 32 of a client device 30 (e.g., a user identifier, an enterprise identifier, a device identifier, etc.). The authentication request 62 may have originated from the client device 22 itself, or from a protected resource server 34, in response to a request to access a protected resource 50.

In response to the authentication request 34, the common authentication framework circuitry 22 of the authentication server circuitry 36 accesses the authentication database 54 to identify an authentication policy (e.g., to ascertain a selected set of IdP providers 38, a type of authentication, specific authentication parameters, etc.) based on the identifying information in the authentication request 62. The common authentication framework circuitry 22 then performs a particular authentication operation utilizing the selected set of IdP providers 38 based on the authentication policy. This authentication operation may involve additional communications through the communications medium 40 to obtain further authentication factors (e.g., a OTP, a biometric scan, etc.). Eventually, the common authentication framework circuitry 22 generates an authentication result indicating whether authentication is successful, and whether the user 32 is allowed to access the protected resource 50.

It should be understood that over time, users 32 across different enterprises are able to utilize the same common authentication framework circuitry 22. For example, a first enterprise may utilize a first identity provider for voice recognition, while a second enterprise utilizes a second identity provider for voice recognition. Due to the framework configuration provided by the common authentication framework circuitry 22, the enterprises are able to replace identity providers at any time. For instance, the first enterprise can replace with the first identity provider with the second identity provider or perhaps even a third identity provider thereafter, etc. Such replacement may be useful if the newer identity providers offer particular features that are not available from the earlier identity providers (e.g., better authentication results, more capacity, faster response times, greater scalability, etc.). Such changes can be effectuated by updating entries within the authentication database 52.

Similarly, perhaps using the same IdP, an enterprise may easily modify its authentication parameters via the common authentication framework circuitry 22. For example, an enterprise may decide to globally change the number of permitted failed authentication attempts before locking out users 32, change the type of authentication, and so on. Again, such changes can be effectuated by updating entries within the authentication database 52. Further details will now be provided with reference to FIG. 2.

Figure 2:
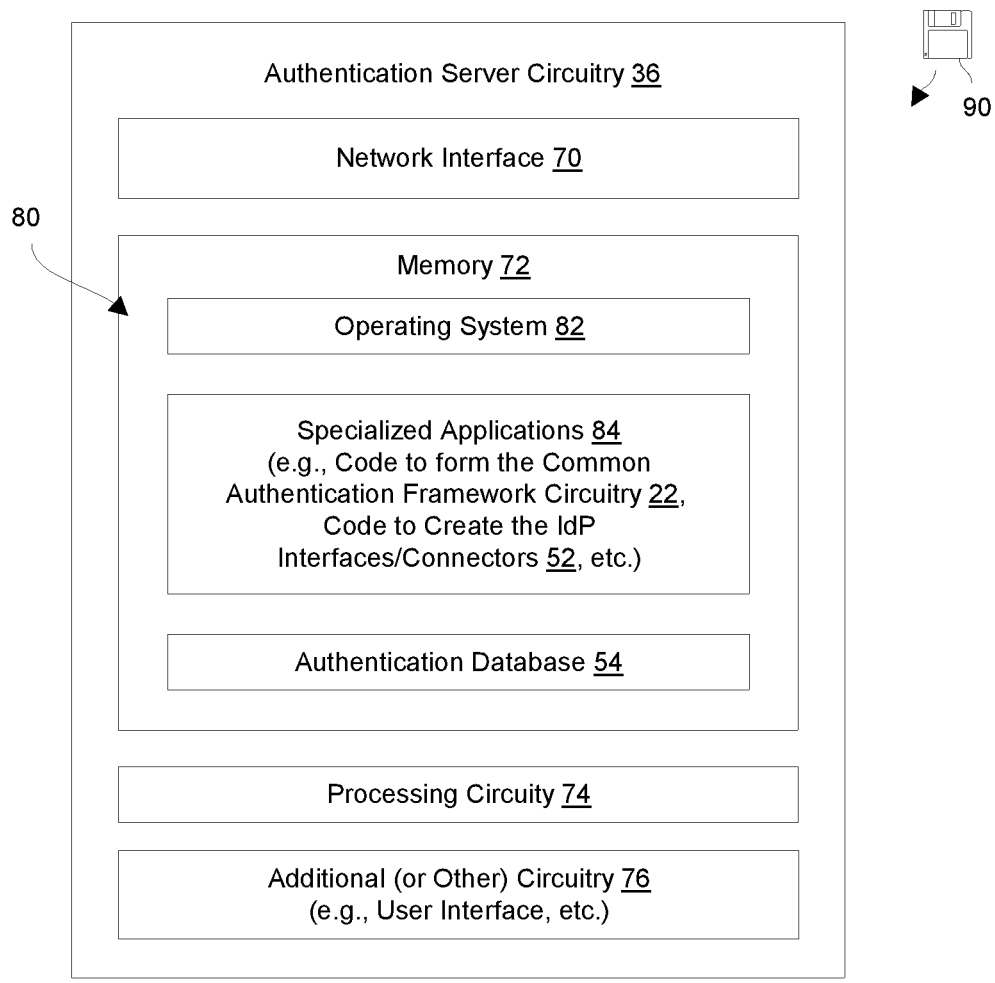
FIG. 2 is a block diagram of authentication server equipment of the electronic environment of FIG. 1.

FIG. 2 shows particular details of the authentication server circuitry 36 of the electronic environment 20. The authentication server circuitry 36 includes a network interface 70, memory 72, processing circuitry 74, and additional (or other) circuitry 76.

The network interface 70 is constructed and arranged to connect the authentication server circuitry 36 to the communications medium 40. Accordingly, the network interface 70 enables the authentication server circuitry 36 to communicate with the other components of the electronic environment 20 (FIG. 1). Such communications may be copper-based, fiber-optic-based, or wireless (i.e., IP-based, SAN-based, cellular, Bluetooth, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82 to manage the computerized resources of the authentication server circuitry 36, specialized applications 84, and the authentication database 54.

The processing circuitry 74 is constructed and arranged to operate in accordance with the various software constructs 80 stored in the memory 72. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the authentication server circuitry 36. The computer program product 90 has a non-transitory (or non-volatile) computer readable medium which stores a set of instructions which controls one or more operations of the authentication server circuitry 36. Examples of suitable computer readable storage media include tangible articles of manufacture and apparatus which store instructions in a non-volatile manner such as CD-ROM, flash memory, disk memory, tape memory, and the like.

The additional (or other) circuitry 76 is optional and represents additional hardware that can be utilized by the authentication server circuitry 36. For example, the authentication server circuitry 36 can include a user interface (i.e., a console or terminal) enabling a human administrator to set up new users 32 and enterprises, to deal with alarms or warning messages, to administer routine maintenance, and so on. As another example, a portion of the authentication server circuitry 36 may operate as a source for applications or apps (e.g., an app store, a central app repository, etc.) to distribute such code to the client devices 30 during configuration/enrollment. Other components and circuitry are suitable for use as well.

Figure 3:
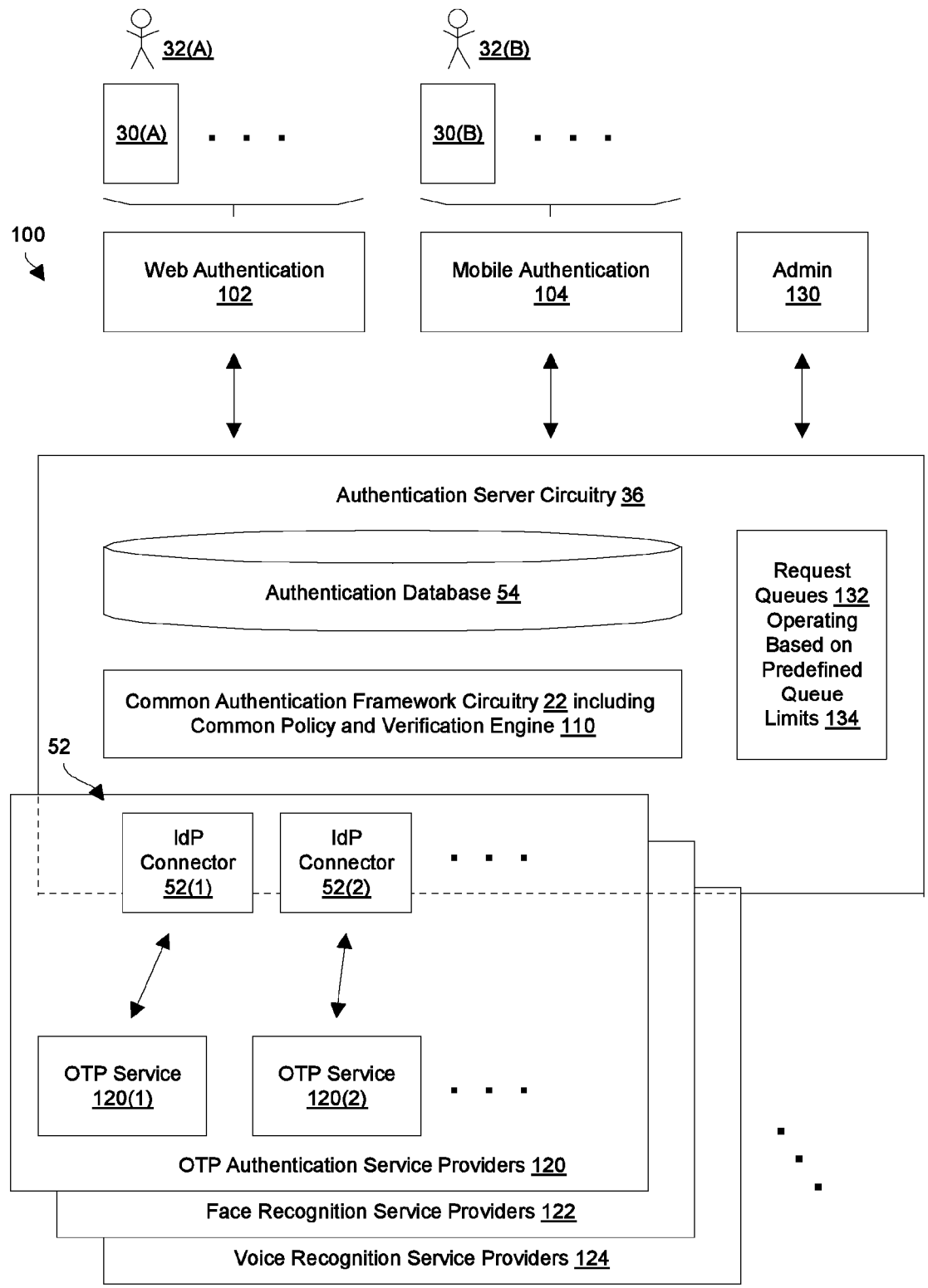
FIG. 3 is a diagrammatical view illustrating operation of the electronic environment of FIG. 1.

FIG. 3 shows a diagrammatical view 100 of the authentication server circuitry 36 during operation. As shown, the authentication server circuitry 36 reliably and robustly controls access to the protected resources 50 within the electronic environment 20. Along these lines, the processing circuitry 74 executes one or more of the specialized applications 84 (also see FIG. 2) to form the common authentication framework circuitry 22.

In particular, the common authentication framework circuitry 22 performs web authentication 102 as well as mobile authentication 104. In connection with web authentication 102, the common authentication framework circuitry 22 (i) receives authentication requests from web users 32(A) operating web-based client devices 30(A) (e.g., desktop and laptop computers running user-level applications), (ii) accesses the authentication database 54 to determine how to authenticate the web users 32(A) in response to each authentication request, and (iii) accordingly performs authentication. Likewise, in connection with mobile authentication 104, the common authentication framework circuitry 22 (i) receives authentication requests from mobile users 32(B) operating mobile client devices 30(B) (e.g., smart phones and tablets running apps), (ii) accesses the authentication database 54 to determine how to authenticate the mobile users 32(B) in response to each authentication request, and (iii) accordingly performs authentication.

As will be explained in further detail shortly, the common authentication framework circuitry 22 includes a common policy and verification engine 110 which performs particular authentication operations in response to authentication requests as defined by the authentication database 54. In particular, the common policy and verification engine 110 determines, for each authentication request, a form of authentication based on a predefined policy stored in the authentication database 54, and then performs an authentication operation in accordance with that policy. For example, for a first employee of Enterprise A, the common policy and verification engine 110 may perform face recognition and OTP authentication. For a second employee of Enterprise A, the common policy and verification engine 110 may perform voice recognition and OTP authentication. However, for all employees of Enterprise B, the common policy and verification engine 110 may perform fingerprint recognition and password authentication, and so on.

As shown at the bottom of FIG. 3, the authentication server circuitry 36 has access to an assortment of identity providers via IdP connectors 52. For example, the common authentication framework circuitry 22 has access to multiple OTP providers 120(1), 120(2), . . . , to perform OTP authentication, multiple face recognition providers 122 to perform face recognition, multiple voice recognition providers 124 to perform voice recognition, and so on. Which identity provider, or combination of identity providers, is used to authenticate the users 32 of each enterprise is determined by the entries of the authentication database 54.

Furthermore, due to the modularized structure of the authentication server circuitry 36 (i.e., the "framework"), the framework can be easily scaled in the cloud for load balancing and serviceability purposes. Moreover, due to the well-structured organization of the framework, enterprises are able to replace identity providers with other identity providers, add identity providers, implement their own authentication methodologies, and so on. Such changes are carried out easily by an administrator 130, e.g., by creating new IdP connectors 52 as needed in order to access each new IdP service, and updating entries of the authentication database 54 with new authentication policies to utilize the new IdP services.

In some arrangements, the authentication server circuitry 36 includes a set of request queues 132 which operate based on predefined queue limits 134. Along these lines, some enterprises may have predefined thresholds (i.e., the queue limits 134) which temporarily hold authentication requests 62 (also see FIG. 1) and predefined sensitivity levels for its client devices 30, its users 32, its protected resources 50, its authentication requests 62, and so on. The common authentication framework circuitry 22 can be configured to add or remove authentication processing capacity (i.e., auto scale within the cloud 24) based on the number of authentication requests 62 in the request queues 132, i.e., based on queue depth. Additionally, the common authentication framework circuitry 22 can be configured to steer authentication requests 62 to different IdPs to prioritize and manage authentication requests and operations.

For instance, when an authentication request queue limit for a particular authentication request queue is not met, the common authentication framework circuitry 22 can process the next authentication request 62 at a normal authentication service regardless of a sensitivity level of that authentication request 62. Likewise, when the authentication request queue limit for the authentication request queue is met and the sensitivity level of a particular authentication request is greater than or equal to the predefined sensitivity threshold, the common authentication framework circuitry 22 can process that authentication request 62 at the normal authentication service. However, when the authentication request queue limit for the authentication request queue is met and the sensitivity level of the particular authentication request is less than the predefined sensitivity threshold, the common authentication framework circuitry 22 can process the that authentication request 62 at a reserve authentication service which is different from the normal authentication service. Such operation enables the common authentication framework circuitry 22 to control authentication methods and requirements via predefined thresholds, sensitivity levels, and so on. Further details will now be provided with reference to FIG. 4.

FIG. 4 shows an example authentication database 54 which is suitable for use by the common authentication framework circuitry 22. The authentication database 54 includes database entries 140(1), 140(2), 140(3), 140(4), 140(5), 140(6), . . . (collectively, database entries 140). Each entry 140 includes a set of fields 150, namely, a user identifier field 152 to hold a user identifier (or ID) which identifies a user 32 (also see FIG. 1), an enterprise identifier field 154 to hold an enterprise identifier which identifies an enterprise, an authentication application field 156 to hold an application identifier which identifies an authentication application, an authentication policy field 158 to hold a policy which identifies how a respective user 32 is to be authenticated, and a set of additional fields 160 to identify further parameters and settings regarding authentication of that respective user 32.

For example, the entry 140(1) indicates that a particular user of Company A runs authentication App2 which authenticates using voice recognition via Identity Provider #1 and OTPs via Identity Provider #2. Similarly, the entry 140(2) indicates that a particular user of Company A runs authentication App2 which authenticates using voice recognition via Identity Provider #1 and OTPs via Identity Provider #2. However, the entry 140(3) indicates that a particular user of Organization C runs authentication App3 which authenticates using retina scanning via Identity Provider #3 and passwords via Identity Provider #4, and so on.

By way of example, a comparison of the entries 140(1) and 140(4) shows that the same enterprise is capable of imposing different types of authentication on different users 32. In particular, user A_5097 of Company A authenticates using a combination of voice recognition and OTPs (see entry 140(1)). However, user A_5099 of Company A authenticates using a combination of face recognition and OTPs (see entry 140(4)). Such a situation is well suited for a variety of reasons such as for a company which wishes to offer its employees choices of different authentication forms but which nevertheless provide suitable security strength, etc.

Additionally, a further comparison of the entries 140(1) and 140(4) shows that the same enterprise is capable of utilizing different IdPs for the same type of authentication. In particular, Company A uses IdP #2 for OTP authentication of user A_5097 (see entry 140(1)). However, Company A uses IdP #6 for OTP authentication of user A_5099 (see entry 140(4)). Such a situation is well suited for a variety of reasons, e.g., one IdP may provide stronger security and thus be better suited for higher security needs within the same company, load balancing, and so on.

Furthermore, a comparison of the entries 140(1) and 140(5) shows that different enterprises are capable of utilizing authentication services from the same identity provider. In particular, both Company A and Institution B utilize IdP #2 for OTP authentication. Such a situation enables the authentication server circuitry 36 (FIGS. 1-3) to take advantage of economies of scale, i.e., combining needs of multiple enterprises into sourcing from the same identity service.

It should be understood that any combination and configuration is available for use by the common authentication framework circuitry 22 thus enabling the framework to offer maximum flexibility. Moreover, services from other IdPs can be made available simply by adding a new IdP via a new IdP connector 52, and then updating entries 140 of the authentication database 54 to use the new IdP.

It should be further understood that the contents of the set of additional fields 160 define certain aspects of authentication for each user 32. Furthermore, the contents can be modified to change how authentication takes place for the users 32. For example, some settings can control the number of unsuccessful authentication attempts that are permitted before a user 32 locked out (i.e., the size of the time window for counting unsuccessful authentication attempts, the number of unsuccessful attempts, the time the user 32 is locked out before the user 32 is allowed to authenticate again, etc.). As another example, some settings can control the level of security in the context of adaptive authentication (i.e., a numerical threshold that, if exceeded by a risk score result, results in unsuccessful authentication, etc.). As yet another example, some parameters can indicate how often a user 32 must reset a password, and so on. Also, the contents of the fields 160 can indicate levels and/or limits such as queue limits, sensitivity levels, etc. Further details will now be provided with reference to FIG. 5.

Figure 5:
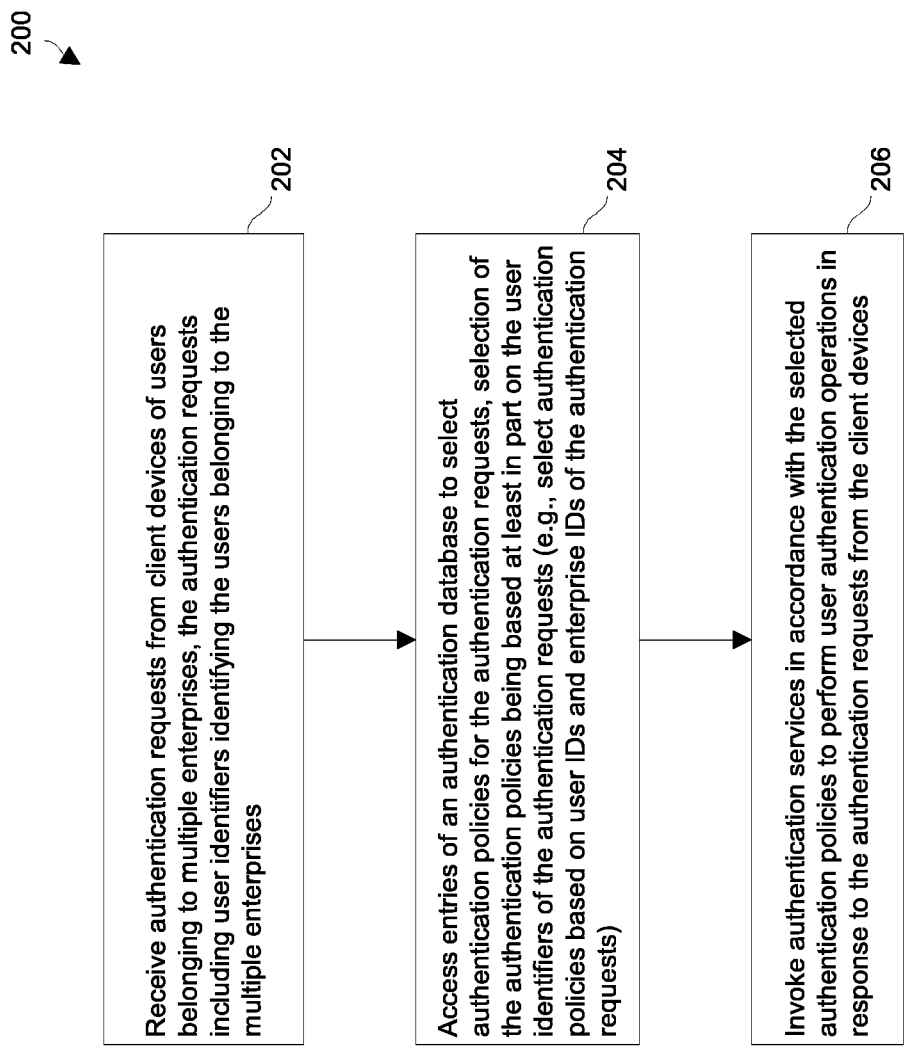
FIG. 5 is a flowchart of a procedure which is performed by the electronic environment of FIG. 1.

FIG. 5 is a flowchart of a procedure 200 which is performed by the common authentication framework circuitry 22 of the electronic environment 20 (FIG. 1). At 202, the common authentication framework circuitry 22 receives authentication requests from client devices 30 of users 32 belonging to multiple enterprises. For example, the users 32(A), 32(B) may belong to a first enterprise, and the user 32(C) may belong to a second enterprise (also see FIG. 1). The authentication requests include user identifiers identifying the users 32 belonging to the multiple enterprises.

At 204, the common authentication framework circuitry 22 accesses entries 140 of an authentication database 54 to select authentication policies for the authentication requests. Selection of the authentication policies is based at least in part on the user identifiers of the authentication requests, At 206, the common authentication framework circuitry 22 invokes authentication services in accordance with the selected authentication policies to perform user authentication operations in response to the authentication requests from the client devices.

As described above, improved techniques are directed to managing authentication using a common authentication framework. The circuitry 22 for such a framework is capable of receiving authentication requests from users belonging to different enterprises or different organizational entities and, based on predefined authentication policies, performing authentication differently in a transparent, well-structured manner. Along these lines, such circuitry 22 can perform authentication using a variety of different authentication factors such as using OTPs with different levels of forgiveness (e.g., different valid OTP time windows, different lockout limits, etc.) for different companies. As another example, such circuitry 22 can use face recognition from one identity provider for Company A, and face recognition from another identify provider for Company B, and so on. Furthermore, when the circuitry 22 is structured to communicate with the identity providers (IdP) via IdP connectors (or interface ports), an enterprise can easily swap one identity provider with another in a transparent manner. Moreover, one or more portions of such circuitry 22 may reside in the cloud for flexibility, scalability, high availability, and so on. Accordingly, companies are able to utilize their own identity providers, operating parameters, and policies for authentication.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the common authentication framework circuitry 22 can be disposed at various locations within the electronic environment 20. In some arrangements, at least a portion of the common authentication framework circuitry 22 is (i) co-located with the common policy engine and (ii) remote from the client devices 30, e.g., within the authentication server circuitry 36. In other arrangements, at least a portion of the common authentication framework circuitry 22 is (i) remote from the common policy engine and (ii) remote from the client devices 30, e.g., located at a protected resource server 34. In yet other arrangements, at least a portion of the common authentication framework circuitry 22 (i) resides within a client device 30 and (ii) is remote from the common policy engine.

Based on the above-provided description, one should appreciate that platform specific authenticators (Web or Mobile) can call a common policy engine. The policies used by the authenticators may simply define factors like OTP or face recognition and whether authentication should be performed on the client device 30 (e.g., via a parameter such as LFace) or in the Cloud 24 (e.g., via a parameter such as Face). Some policies can include parameters based on class (e.g., Face may include threshold of accuracy). Likewise, Location may include level of assurance in source such as GPS vs. Geo IP, or Diameter of certainty required such as proximity (e.g., within in a 5 mile region, or in the state of Massachusetts, etc.).

In some arrangements, the common authentication framework circuitry 22 abstracts the need to re-implement connectivity to an admin layer, exposing parameters and interacting with the policy engine. Here, the verification portion of the common authentication framework circuitry 22 may deal with parameters dealing with verifying the factor, like number of attempts for passwords. Such arrangements make implementing a factor like password simple in case the enterprise needs a new source of passwords and allows to abstract common traits of biometric methods. The policy portion of the common authentication framework circuitry 22 abstracts the need to know if this is a native authentication method or external with all the complexities of registering a service, connecting, managing network outages and similar challenges. Also this layer leverages the cloud provider while not being locked down.

It should be further understood that public clouds enable leveraging burst capabilities to deal with spikes of authentication and separating the concerns. For example, auto scaling that is based on queue depth to launch new authentication method(s) can be used for Face recognition that is highly CPU intensive or calls a remote implementation.

Additionally, suppose that a back-end authentication service runs in an auto scale group that is fed from a queue (also see the request queue 132 in FIG. 3). Thresholds such as queue limits 132 can be used to control authentication that is based on authentication methods and customer requirements. Some customers will have a threshold for a certain method, like a contract with a first voice recognition provider which states that in less busy times send an authentication request to the queue of the first voice recognition provider, but if queue limit is met, send the authentication request to another less expensive authenticator, but only if the authentication request is for applications that are of sensitivity level of a certain level and below. Here, others must wait or use an OTP device. This situation enables easy control (e.g., setting of face or OTP) and allows the system to self-regulate on which equipment gets to perform more authentications or verify against more than one implementation.

One should appreciate that the above-described techniques allow addition of as many authentication providers as desired, allows some equipment to reside on premise (e.g., within the enterprise) and some in the cloud (e.g., maintained by a trusted-third party) while tolerating performance and availability challenges in each component without taking down the whole system. Also this architecture described above allows leveraging of cloud provider abilities to scale horizontally using mechanisms like auto scaling groups, elastic load balancers, queuing mechanisms that support scaling and dynamic software based routing, and so on. Accordingly, while the main concepts are known, leveraging the features of new platforms to the max can be achieved. F or example, higher authentication per second rates can be tolerated even from slow sources since authentication requests can be routed and processed at different locations, since additional sources and be offered or activated, and/or since the requests can be throttled insisting to authenticate with those sources while not affecting the whole system. Such modifications and enhancements are intended to belong to various embodiments of the disclosure.

What is claimed is:

1. A method of managing user authentication via common authentication framework circuitry, the method comprising:
receiving, by the common authentication framework circuitry, authentication requests from client devices of users belonging to multiple enterprises, the authentication requests including user identifiers identifying the users belonging to the multiple enterprises;
accessing, by the common authentication framework circuitry, entries of an authentication policy database to select authentication policies for the authentication requests, selection of the authentication policies being based at least in part on the user identifiers of the authentication requests;
invoking, by the common authentication framework circuitry, authentication services in accordance with the selected authentication policies to perform user authentication operations in response to the authentication requests from the client devices;
wherein the common authentication framework circuitry (i) includes an authentication request queue to temporarily store the authentication requests and (ii) imposes a predefined sensitivity threshold as a measure of sensitivity; and wherein the method further comprises:

receiving another authentication request from another client device of another user, the other authentication request including another user identifier which identifies the other user;

when an authentication request queue limit for the authentication request queue is not met, processing at least a portion of the other authentication request at a normal authentication service regardless of a sensitivity level of the other authentication request;

when (i) the authentication request queue limit for the authentication request queue is met and (ii) the sensitivity level of the other authentication request is greater than or equal to the predefined sensitivity threshold, processing at least a portion of the other authentication request at the normal authentication service; and when (i) the authentication request queue limit for the authentication request queue is met and (ii) the sensitivity level of the other authentication request is less than the predefined sensitivity threshold, processing at least the portion of the other authentication request at a reserve authentication service which is different from the normal authentication service.

2. A method as in claim 1 wherein the authentication requests further include enterprise identifiers identifying the multiple enterprises; and wherein accessing the entries of the authentication policy database to select the authentication policies for the authentication requests includes:

selecting authentication policies for the authentication requests based on (i) the user identifiers of the authentication requests and (ii) the enterprise identifiers of the authentication requests.

3. A method as in claim 2 wherein receiving the authentication requests includes:

receiving a first authentication request from a first client device of a first user belonging to a first enterprise, the first authentication request including a first user identifier which identifies the first user and a first enterprise identifier which identifies the first enterprise, and receiving a second authentication request from a second client device of a second user belonging to a second enterprise, the second authentication request including a second user identifier which identifies the second user and a second enterprise identifier which identifies the second enterprise, the first enterprise and the second enterprise being separate organizational entities; and wherein selecting the authentication policies for the authentication requests includes:

for the first authentication request, choosing a first authentication policy from a plurality of authentication policies in the authentication policy database based on the first user identifier and the first enterprise identifier, and for the second authentication request, choosing a second authentication policy from the plurality of authentication policies based on the second user identifier and the second enterprise identifier.

4. A method as in claim 3 wherein invoking the authentication services in accordance with the selected authentication policies to perform user authentication operations in response to the authentication requests from the client devices includes:

in response to the first authentication request, identifying a first set of authentication services based on the first authentication policy and invoking the first set of authentication services to authenticate a current user of the first client device, and in response to the second authentication request, identifying a second set of authentication services based on the second authentication policy and invoking the second set of authentication services to authenticate a current user of the second client device.

5. A method as in claim 4 wherein the common authentication framework circuitry is constructed and arranged to operate as a common policy engine having different authentication factor modules which connect to different authentication service sources through different identity provider connectors;

wherein invoking the first set of authentication services includes directing a first set of the authentication factor modules of the common policy engine to provide a first set of authentication factors from the current user of the first client device to a first set of authentication service sources via a first set of identity provider connectors to authenticate the current user of the first client device; and wherein invoking the second set of authentication services includes directing a second set of the authentication factor modules of the common policy engine to provide a second set of authentication factors from the current user of the second client device to a second set of authentication service sources via a second set of identity provider connectors to authenticate the current user of the second client device.

6. A method as in claim 5 wherein at least one of the first set of authentication service sources is (i) co-located with the common policy engine and (ii) remote from the first client device.

7. A method as in claim 5 wherein at least one of the first set of authentication service sources is located at a third party service provider location which is (i) remote from the common policy engine and (ii) remote from the first client device.

8. A method as in claim 5 wherein at least one of the first set of authentication service sources (i) resides within the first client device and (ii) is remote from the common policy engine.

9. A method as in claim 5 wherein a first authentication service source of the first set of authentication service sources is (i) co-located with the common policy engine and (ii) remote from the first client device;

wherein a second authentication service source of the first set of authentication service sources is located at a third party service provider location which is (i) remote from the common policy engine and (ii) remote from the first client device; and wherein a third authentication service source of the first set of authentication service sources (i) resides within the first client device and (ii) is remote from the common policy engine.

10. A common authentication framework apparatus, comprising:

a communications interface;

memory which holds an authentication policy database; and control circuitry coupled to the communications interface and the memory, the memory storing instructions which, when carried out by the control circuitry, cause the control circuitry to:

receive authentication requests from client devices of users belonging to multiple enterprises through the communications interface, the authentication requests including user identifiers identifying the users belonging to the multiple enterprises, access entries of the authentication policy database to select authentication policies for the authentication requests, selection of the authentication policies being based at least in part on the user identifiers of the authentication requests, and invoke authentication services in accordance with the selected authentication policies to perform user authentication operations in response to the authentication requests from the client devices;

wherein the control circuitry (i) includes an authentication request queue to temporarily store the authentication requests and (ii) imposes a predefined sensitivity threshold as a measure of sensitivity; and wherein the control circuitry is further constructed and arranged to:

receive another authentication request from another client device of another user, the other authentication request including another user identifier which identifies the other user, when an authentication request queue limit for the authentication request queue is not met, process at least a portion of the other authentication request at a normal authentication service regardless of a sensitivity level of the other authentication request, when (i) the authentication request queue limit for the authentication request queue is met and (ii) the sensitivity level of the other authentication request is greater than or equal to the predefined sensitivity threshold, process at least a portion of the other authentication request at the normal authentication service, and when (i) the authentication request queue limit for the authentication request queue is met and (ii) the sensitivity level of the other authentication request is less than the predefined sensitivity threshold, process at least the portion of the other authentication request at a reserve authentication service which is different from the normal authentication service.

11. A common authentication framework apparatus as in claim 10 wherein the authentication requests further include enterprise identifiers identifying the multiple enterprises; and wherein the control circuitry, when accessing the entries of the authentication policy database to select the authentication policies for the authentication requests, is constructed and arranged to:

select authentication policies for the authentication requests based on (i) the user identifiers of the authentication requests and (ii) the enterprise identifiers of the authentication requests.

12. A common authentication framework apparatus as in claim 11 wherein the control circuitry, when receiving the authentication requests, is constructed and arranged to:

receive a first authentication request from a first client device of a first user belonging to a first enterprise, the first authentication request including a first user identifier which identifies the first user and a first enterprise identifier which identifies the first enterprise, and receive a second authentication request from a second client device of a second user belonging to a second enterprise, the second authentication request including a second user identifier which identifies the second user and a second enterprise identifier which identifies the second enterprise, the first enterprise and the second enterprise being separate organizational entities; and wherein the control circuitry, when selecting the authentication policies for the authentication requests, is constructed and arranged to:

for the first authentication request, choose a first authentication policy from a plurality of authentication policies in the authentication policy database based on the first user identifier and the first enterprise identifier, and for the second authentication request, choose a second authentication policy from the plurality of authentication policies based on the second user identifier and the second enterprise identifier.

13. A common authentication framework apparatus as in claim 12 wherein the control circuitry, when invoking the authentication services in accordance with the selected authentication policies to perform user authentication operations in response to the authentication requests from the client devices, is constructed and arranged to:

in response to the first authentication request, identify a first set of authentication services based on the first authentication policy and invoke the first set of authentication services to authenticate a current user of the first client device, and in response to the second authentication request, identify a second set of authentication services based on the second authentication policy and invoke the second set of authentication services to authenticate a current user of the second client device.

14. A common authentication framework apparatus as in claim 13 wherein the control circuitry is constructed and arranged to operate as a common policy engine having different authentication factor modules which connect to different authentication service sources through different identity provider connectors;

wherein the control circuitry, when invoking the first set of authentication services, is constructed and arranged to direct a first set of the authentication factor modules of the common policy engine to provide a first set of authentication factors from the current user of the first client device to a first set of authentication service sources via a first set of identity provider connectors to authenticate the current user of the first client device; and wherein the control circuitry, when invoking the second set of authentication services, is constructed and arranged to direct a second set of the authentication factor modules of the common policy engine to provide a second set of authentication factors from the current user of the second client device to a second set of authentication service sources via a second set of identity provider connectors to authenticate the current user of the second client device.

15. A computer program product having a non-transitory computer readable medium which stores a set of instructions to manage user authentication, the set of instructions, when carried out by computerized circuitry, causing the computerized circuitry to perform a method of:

receiving authentication requests from client devices of users belonging to multiple enterprises, the authentication requests including user identifiers identifying the users belonging to the multiple enterprises;

accessing entries of an authentication policy database to select authentication policies for the authentication requests, selection of the authentication policies being based at least in part on the user identifiers of the authentication requests; and invoking authentication services in accordance with the selected authentication policies to perform user authentication operations in response to the authentication requests from the client devices;

wherein the computerized circuitry (i) includes an authentication request queue to temporarily store the authentication requests and (ii) imposes a predefined sensitivity threshold as a measure of sensitivity; and wherein the method further comprises:
receiving another authentication request from another client device of another user, the other authentication request including another user identifier which identifies the other user;
when an authentication request queue limit for the authentication request queue is not met, processing at least a portion of the other authentication request at a normal authentication service regardless of a sensitivity level of the other authentication request;
when (i) the authentication request queue limit for the authentication request queue is met and (ii) the sensitivity level of the other authentication request is greater than or equal to the predefined sensitivity threshold, processing at least a portion of the other authentication request at the normal authentication service; and
when (i) the authentication request queue limit for the authentication request queue is met and (ii) the sensitivity level of the other authentication request is less than the predefined sensitivity threshold, processing at least the portion of the other authentication request at a reserve authentication service which is different from the normal authentication service.

16. A computer program product as in claim 15 wherein the authentication requests further include enterprise identifiers identifying the multiple enterprises; and wherein accessing the entries of the authentication policy database to select the authentication policies for the authentication requests includes:
selecting authentication policies for the authentication requests based on (i) the user identifiers of the authentication requests and (ii) the enterprise identifiers of the authentication requests.

17. A computer program product as in claim 16 wherein receiving the authentication requests includes:
receiving a first authentication request from a first client device of a first user belonging to a first enterprise, the first authentication request including a first user identifier which identifies the first user and a first enterprise identifier which identifies the first enterprise, and
receiving a second authentication request from a second client device of a second user belonging to a second enterprise, the second authentication request including a second user identifier which identifies the second user and a second enterprise identifier which identifies the second enterprise, the first enterprise and the second enterprise being separate organizational entities; and
wherein selecting the authentication policies for the authentication requests includes:
for the first authentication request, choosing a first authentication policy from a plurality of authentication policies in the authentication policy database based on the first user identifier and the first enterprise identifier, and
for the second authentication request, choosing a second authentication policy from the plurality of authentication policies based on the second user identifier and the second enterprise identifier.

18. A computer program product as in claim 17 wherein invoking the authentication services in accordance with the selected authentication policies to perform user authentication operations in response to the authentication requests from the client devices includes:
in response to the first authentication request, identifying a first set of authentication services based on the first authentication policy and invoking the first set of authentication services to authenticate a current user of the first client device, and
in response to the second authentication request, identifying a second set of authentication services based on the second authentication policy and invoking the second set of authentication services to authenticate a current user of the second client device.

19. A computer program product as in claim 18 wherein the computerized circuitry is constructed and arranged to operate as a common policy engine having different authentication factor modules which connect to different authentication service sources through different identity provider connectors;
wherein invoking the first set of authentication services includes directing a first set of the authentication factor modules of the common policy engine to provide a first set of authentication factors from the current user of the first client device to a first set of authentication service sources via a first set of identity provider connectors to authenticate the current user of the first client device; and
wherein invoking the second set of authentication services includes directing a second set of the authentication factor modules of the common policy engine to provide a second set of authentication factors from the current user of the second client device to a second set of authentication service sources via a second set of identity provider connectors to authenticate the current user of the second client device.

20. A method as in claim 1, further comprising:
during operation of the common authentication framework circuitry, modifying the authentication request queue limit to change processing capacity of at least a portion of the common authentication framework circuitry.

* * * * *